United States Patent
Egawa (10) Patent No.: US 7,235,287 B2
(45) Date of Patent: Jun. 26, 2007

(54) BIODEGRADABLE LAMINATED SHEET

(75) Inventor: Yosuke Egawa, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 10/595,261

(22) PCT Filed: Sep. 29, 2004

(86) PCT No.: PCT/JP2004/014241

§ 371 (c)(1),
(2), (4) Date: May 18, 2006

(87) PCT Pub. No.: WO2005/032818

PCT Pub. Date: Apr. 14, 2005

(65) Prior Publication Data

US 2006/0286373 A1 Dec. 21, 2006

(30) Foreign Application Priority Data

Oct. 1, 2003 (JP) .............................. 2003-343489
Sep. 29, 2004 (JP) .............................. 2004-283100

(51) Int. Cl.
*B32B 7/02* (2006.01)
*B32B 27/08* (2006.01)
*B32B 27/36* (2006.01)

(52) U.S. Cl. ............... 428/212; 428/213; 428/215; 428/339; 428/480

(58) Field of Classification Search ............ None
See application file for complete search history.

(56) References Cited

U.S. PATENT DOCUMENTS 6,153,276 A * 11/2000 Oya et al. ................ 428/35.2
6,326,440 B1 * 12/2001 Terada et al. ............. 525/411
6,372,331 B1 * 4/2002 Terada et al. ............. 428/212
2003/0039775 A1 * 2/2003 Kong ....................... 428/34.9

(Continued)

FOREIGN PATENT DOCUMENTS

JP 8-193165 A 7/1996

(Continued)

OTHER PUBLICATIONS

International Search Report for PCT/JP2004/014241 mailed Dec. 21, 2004.

(Continued)

*Primary Examiner*—Vivian Chen
(74) *Attorney, Agent, or Firm*—Darby & Darby (57) ABSTRACT

The biodegradable sheet is a laminated sheet including at least two layers. Each of the layers forming the laminated sheet is a resin composition comprising 75 to 25% by mass of a polylactic acid resin, and 25 to 75% by mass of a polyester resin having a glass transition temperature not exceeding 0 degrees C. and a melting point higher than the glass transition temperature of the polylactic acid resin, and not exceeding the melting point of the polylactic acid resin, based on 100 mass percent of the total amount of the polylactic acid resin and the polyester resin. The D-lactic acid content of the polylactic acid resin contained in one layer, and the D-lactic acid content of the polylactic acid resin in the other layer are determined to satisfy a predetermined relationship. The laminated sheet is subjected to crystallization treatment.

12 Claims, 1 Drawing Sheet

U.S. PATENT DOCUMENTS

2005/0244606 A1* 11/2005 Egawa ..................... 428/98
2006/0040119 A1* 2/2006 Egawa ..................... 428/480

FOREIGN PATENT DOCUMENTS

| JP | 2000-141955 A | | 5/2000 |
| JP | 2001-219522 | * | 8/2001 |
| JP | 2001-219522 A | | 8/2001 |
| JP | 2002-127343 | * | 5/2002 |
| JP | 2002-127343 A | | 5/2002 |
| JP | 2003-094585 | * | 4/2003 |
| JP | 2003-94585 A | | 4/2003 |
| JP | 2003-147177 | * | 5/2003 |
| JP | 2003-147177 A | | 5/2003 |
| JP | 2003-170560 | * | 6/2003 |
| JP | 2003-170560 A | | 6/2003 |

OTHER PUBLICATIONS

Patent Abstracts of Japan for JP2003-170560 published Jun. 17, 2003.
Patent Abstracts of japan for JP2002-127343 published May 8, 2002.
Patent Abstracts of Japan for JP2000-141955 published May 23, 2000.
Patent Abstracts of japan for JP2001-219522 published Aug. 14, 2001.
Patent Abstracts of Japan for JP2003-94585 published Apr. 3, 2003.
Patent Abstracts of Japan for JP8-193165 published Jul. 30, 1996.
Patent Abstracts of Japan for JP2003-147177 published May 21, 2003.

* cited by examiner

FIG. 1

BIODEGRADABLE LAMINATED SHEET

This application is a U.S. national phase application under 35 U.S.C. §371 of International Patent Application No. PCT/JP2004/014241, filed Sep. 29, 2004, and claims the benefit of Japanese Applications No. 2003-343489, filed Oct. 1, 2003 and 2004-283100 filed Sep. 29, 2004. The International Application was published in Japanese on Apr. 14, 2005 as International Publication No. WO 2005/032818 under PCT Article 21(2).

1. Technical Field

This invention relates to a biodegradable laminated sheet, an article made of such a sheet, and a method of forming such an article.

2. Background Art

Plastics such as polyethylene, polypropylene, polyvinyl chloride, polystyrene and polyethylene terephthalate have been used as materials for food containers such as cups and trays, blister packs, hot-fill containers, trays for carrying electronic parts, carrier tapes, etc.

These plastic products are usually discarded soon after use, and how to dispose of them by e.g. burning or burying is becoming a big issue now. Specifically, such resins as polyethylene, polypropylene and polystyrene are high in calorific value when burned, so that they tend to damage incinerators when burned therein. Polyvinyl chloride produces noxious gases when burned. When these plastic products are buried, they tend to fill burial sites in short periods of time because they scarcely decompose in natural environments due to their chemical stability and thus semi-permanently remain in the soil. If dumped in natural environments, they will ruin the landscape or destroy the habitat of marine animals.

Therefore, in order to protect environment, studies and developments of biodegradable materials are now being vigorously made. One of such biodegradable materials is polylactic acid resin. Since polylactic acid resin is biodegradable, it naturally hydrolyzes in the soil or in the water and is decomposed by microorganisms into harmless substances. Also, due to its low combustion heat, it does not damage incinerators even if burned therein. Moreover, since polylactic acid resin is derived from vegetables, it does not depend on oil, one of the natural resources that are expected to be exhausted.

But because polylactic acid resin is low in heat resistance, it has been considered to be unsuitable as a material of containers used at high temperature such as containers for storing foods to be heated or boiled water. Also, if sheets of polylactic acid resin or articles made of such sheets are stored in a warehouse or transported in a truck or a ship, because the interior of such a warehouse, truck or ship often heats up to a high temperature e.g. in summertime, they tend to be deformed or fused to each other.

JP patent publication 8-193165A discloses a technique for improving the heat resistance of polylactic acid resin by retaining polylactic acid resin in a mold kept at a temperature close to the crystallizing temperature of polylactic acid resin (80 to 130 degrees C.), thereby highly crystallizing the polylactic acid resin.

JP patent publication 2003-147177A ("JP '177") it is known to improve the heat resistance, impact resistance and formability of an article formed of a single-layer sheet made of a resin composition comprising polylactic acid resin and polyester by pre-crystallizing the single-layer sheet.

DISCLOSURE OF THE INVENTION

Problems to which the Invention Seeks a Solution

But in the former method, because molded polylactic acid is crystallized in the mold, the molded polylactic acid resin has to be retained in the mold while it is being crystallized, so that the molding cycle is longer than usual, which increases the production cost. Also, a heating facility is additionally necessary to heat the mold.

In the case of the single-layer sheet of JP '177, if a plurality of articles are formed from the sheet using a multi-cavity mold, wrinkles called "bridges" may develop on the articles according to their shape. Articles formed by deep-drawing the sheet with a vacuum forming machine, or blister articles formed from the above sheet, which have complicate shapes, shaping properties of the mold tends to slightly worsen.

An object of the invention is to provide a biodegradable laminated sheet which does not cause environmental problems, is high in heat resistance, impact resistance and strength when subjected to loads at high temperature, does not develop wrinkles/"bridges", and which can be easily deep-drawn or formed into blister articles, which are typically complicated in shape, and articles formed of such a biodegradable laminated sheet. Means to Solve the Problems According to the present invention, in order to accomplish the above object, there is provided a biodegradable laminated sheet comprising at least two layers, each of the two layers comprising a resin composition containing 75 to 25 mass percent of a polylactic acid resin, and 25 to 75 mass percent of a polyester resin having a glass transition temperature not exceeding 0 degrees C., and having a melting point higher than the glass transition temperature of the polylactic acid resin, and not exceeding the melting point of the polylactic acid resin, based on 100 mass percent of the total amount of the polylactic acid resin and the polyester resin, wherein the content Da (%) of D-lactic acid of the polylactic acid resin contained in one of the at least two layers and the content Db (%) of D-lactic acid of the polylactic acid resin contained in the other of the at least two layers satisfy the following relations (1):

$$Da \leq 7 \text{ and } Db - Da > 3 \tag{1}$$

the laminated sheet being subjected to crystallization treatment.

Advantages of the Invention

Because the laminated sheet according to the present invention comprises a polylactic acid resin and a polyester resin, it will not cause any environmental problems.

Because the laminated sheet according to the invention comprises a first layer containing D-lactic acid by not more than 7%, and a second layer containing D-lactic acid in an amount which is more than 3% higher in content than the D-lactic acid contained in the first layer, when the laminated sheet is crystallized, the first layer, of which the D-lactic acid content is lower, is more likely to crystallize than the second layer. Thus, the laminated sheet according to the invention includes not only a layer which is crystallized before forming but also a layer which is less likely to crystallize. This eliminates the need to keep the mold temperature near the crystallizing temperature of the polylactic acid resin (80 to 130 degrees C.) to promote crystallization of the laminated sheet, and makes it possible to form the laminated sheet with the mold kept at normal temperature in a normal forming cycle. The article thus formed shows sufficient heat resistance.

Since the laminated sheet according to the present invention includes a layer which is difficult to crystallize, deep-drawn article and blister articles, which are typically complicated in shape, can be formed from the laminated sheet according to the invention.

The laminated sheet according to the present invention, which contains a polyester resin having specific glass transition temperature (Tg) and melting point, and articles formed from such a sheet are high in heat resistance, impact resistance, formability and strength when subjected to loads at high temperature. They are also less likely to develop wrinkles/"bridges".

DETAILED DESCRIPTION OF THE INVENTION

The biodegradable laminated sheet according to the present invention includes at least two layers each comprising a resin composition containing a polylactic acid resin and a predetermined polyester resin.

The polylactic acid resin is a polymer obtained by condensation-polymerizing a monomer containing lactic acids as its major components. There are two kinds of lactic acids, i.e. L-lactic acid and D-lactic acid, which are optical isomers. The polylactic acid resin shows different crystallinity according to the ratio of the contents of these two kinds of lactic acids. A random copolymer which contains L-lactic acid and D-lactic acid at the rate of 80:20 to 20:80 is a completely amorphous, transparent polymer having no crystallinity. It softens at around the glass transition temperature of 60 degrees C.

A random copolymer containing L-lactic acid and D-lactic acid at the rate of 100:0 to 80:20 or 20:80 to 0:100 has crystallizability. While its crystallinity depends on the ratio of the contents of L-lactic acid and D-lactic acid, its glass transition temperature is about the same as the former copolymer, i.e. about 60 degrees C. By melt-extruding this copolymer and quickly cooling it soon after the melt extrusion, it turns into a highly transparent, amorphous material. By slowly cooling it, however, it turns into a crystalline material. A homopolymer, i.e. a polymer containing only L-lactic acid or D-lactic acid is a semicrystalline polymer having a melting point of not less than 180 degrees C.

The polylactic acid resin used in the present invention may be a homopolymer containing L-lactic acid or D-lactic acid as its structural units, namely poly(L-lactic acid) or poly(D-lactic acid), a copolymer containing both L-lactic acid and D-lactic acid as its structural units, namely poly (DL-lactic acid), or a mixture thereof. It may also be a copolymer of the abovementioned polymer and other hydroxycarboxylic acids or diol/dicarboxylic acids. It may also contain a small amount of chain extender residues.

The polylactic acid resin may be polymerized by a known method such as condensation polymerization or ring-opening polymerization. In condensation polymerization, polylactic acid having a desired composition is obtainable by directly subjecting L-lactic acid, D-lactic acid or a mixture thereto to dehydrating condensation polymerization.

In ring-opening polymerization (lactide method), polylactic acid is obtainable from lactide, a cyclic dimer of lactic acid, using a selected catalyst with a polymerization adjusting added if necessary.

The abovementioned other hydroxycarboxylic acids to be copolymerized with the polylactic acid may be an optical isomer of lactic acid (for example, D-lactic acid if the lactic acid is L-lactic acid, and L-lactic acid if the lactic acid is D-lactic acid), bifunctional aliphatic hydroxycarboxylic acids such as glycolic acid, 3-hydroxybutyric acid, 4-hydroxybutyric acid, 2-hydroxy-n-butyric acid, 2-hydroxy-3, 3-dimethylbutyric acid, 2-hydroxy-3-methylbutyric acid, 2-methyllactic acid and 2-hydroxycaproic acid, and lactones such as caprolactone, butyrolactone and valerolactone.

The abovementioned aliphatic diols to be copolymerized with the polylactic acid polymer may be ethylene glycol, 1,4-butanediol or 1,4-cyclohexanedimethanol. The abovementioned aliphatic dicarboxylic acids may be succinic acid, adipic acid, suberic acid, sebacic acid or dodecanedioic acid.

Also, if necessary, as small amounts of copolymerizing components, non-aliphatic dicarboxylic acids such as terephthalic acid and/or non-aliphatic diols such as ethylene oxide adducts of bisphenol A may be used.

The polylactic acid resin used in this invention has a weight-average molecular weight preferably in the range of 60000 to 700000, more preferably 80000 to 400000, especially preferably 100000 to 300000. If the molecular weight is too small, the practical physical properties such as mechanical strength and heat resistance will scarcely improve. If too large, the melt viscosity will rise to such an extent as to impair formability and workability.

The abovementioned predetermined polyester resin refers to a polyester resin having specific glass transition temperature (Tg) and melting point. Preferably, the polyester resin has a glass transition temperature (Tg) not exceeding 0 degrees C., more preferably not exceeding −20 degrees C. If the glass transition temperature is higher than 0 degrees C., improvements in the impact resistance tend to be insufficient.

The polyester resin has preferably a melting point higher than the glass transition temperature (Tg) of the polylactic acid resin added, more preferably a melting point of not less than 80 degrees C. If lower than this range, the article formed from the laminated sheet may be insufficient in heat resistance. The upper limit of the melting point of the polyester resin is the melting point of the polylactic acid resin added. If higher than the melting point of the polylactic acid added, it is meaningless to crystallize the polylactic acid contained in the laminated sheet before forming the laminated sheet, and problems regarding rigidity and formability will arise. The polylactic acid resin has typically a melting point of 135 to 180 degrees C., though it varies with the mixture ratio of its structural units, namely, L-lactic acid and D-lactic acid.

By using a polyester resin having specific glass transition temperature and melting point in the above ranges, the laminated sheet obtained and articles formed from such a laminated sheet will show improved heat resistance, impact resistance and formability.

Such polyester resins include biodegradable aliphatic polyesters other than polylactic acid resin. Such biodegradable aliphatic polyesters include aliphatic polyesters obtained by condensing polyhydroxycarboxylic acids, aliphatic diols and aliphatic dicarboxylic acids, aliphatic-aromatic polyesters obtained by condensing aliphatic diols, aliphatic dicarboxylic acids and aromatic dicarboxylic acids, aliphatic polyester copolymers obtained from aliphatic diols, aliphatic dicarboxylic acids and hydroxycarboxylic acids, aliphatic polyesters obtained by subjecting cyclic lactones to ring-opening polymerization, synthetic aliphatic polyesters, and aliphatic polyesters biosynthesized in bacteria.

The abovementioned polyhydroxycarboxylic acids include homopolymers and copolymers of hydroxycarboxylic acids such as 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid and 2-hydroxycaproic acid.

The abovementioned aliphatic diols include ethylene glycol, 1,4-butanediol and 1,4-cyclohexanedimethanol. The abovementioned aliphatic dicarboxylic acids include succinic acid, adipic acid, suberic acid, sebacic acid or dodecanedioic acid. The abovementioned aromatic dicarboxylic acids include terephthalic acid and isophthalic acid.

The aliphatic polyesters obtained by condensing such aliphatic diols and aliphatic dicarboxylic acids, and the aliphatic-aromatic polyesters obtained aliphatic diols, aliphatic dicarboxylic acids and aromatic dicarboxylic acids are obtained by subjecting at least one of the abovementioned compounds to condensation polymerization. A desired polymer is then obtained by optionally extending chains with e.g. isocyanate compounds.

The abovementioned aliphatic polyesters include polyethylene succinate, polybutylene succinate, polybutylene succinate adipate and polybutylene succinate carbonate. The abovementioned aliphatic-aromatic polyesters include polybutylene adipate terephthalate, and polybutylene succinate adipate terephthalate Aliphatic diols and aliphatic carboxylic acids used in the aliphatic polyester copolymers obtained from aliphatic diols, aliphatic dicarboxylic acids and hydroxycarboxylic acids may be those mentioned above. Further, hydroxycarboxylic acids may also L-lactic acid, D-lactic acid, DL-lactic acid, glycolic acid, 3-hydroxybutyric acid, 4-hydroxybutyric acid, 2-hydroxy-n-butyric acid, 2-hydroxy-3,3-dimethylbutyric acid, 2-hydroxy-3-methyl-butyric acid, 2-methyllactic acid, 2-hydroxycaproic acid, etc.

The abovementioned aliphatic polyester copolymers include polybutylene succinate lactic acid and polybutylene succinate adipate lactic acid. But in this case, as for their compositions, aliphatic diols and aliphatic dicarboxylic acids are their major components. That is, the molar ratio between aliphatic diols, aliphatic dicarboxylic acids and hydroxycarboxylic acids is preferably 30-49.99:35-49.99: 30-0.02.

The aliphatic polyesters obtained by subjecting cyclic lactones as mentioned above to ring-opening polymerization are obtained by polymerizing one or more kinds of cyclic monomers such as ε-caprolactone, δ-valerolactone, β-methyl-δ-valerolactone.

The abovementioned synthetic aliphatic polyesters include copolymers of cyclic acid anhydrides and oxiranes such as copolymers of succinic anhydride and ethylene oxide or propylene oxide.

The abovementioned aliphatic polyesters biosynthesized in bacteria include aliphatic polyesters biosynthesized in bacteria such as *Alcaligenes eutrophus* by the action of acetyl coenzyme A. While such aliphatic polyesters mainly comprise poly-β-hydroxybutyric acid (poly-3HB), it is industrially advantageous to copolymerize them with hydroxyvaleric acid (HV) into copolymers of poly(3HB-CO-3HV) (copolymers of hydroxybutyrate and hydroxyvalerate), thereby improving its practicality as plastics. The HV copolymerization ratio is preferably 0 to 40 mol %. Instead of hydroxyvaleric acid, they may be copolymerized with long-chained alkanoate such as 3-hydroxyhexanoate, 3-hydroxyoctanoate or 3-hydroxyoctadecanoate. Copolymers of 3HB and 3-hydroxyhexanoate include a copolymer of hydroxybutyrate and hydroxyhexanoate.

The mixture ratio (in mass) of the polylactic acid resin and the polyester resin in the above-described resin composition is preferably 75-25:25-75, more preferably 65:35 to 35:65. If the content of the polylactic acid resin is higher than 75% by mass, formability is inferior, so that general-purpose forming such as vacuum forming or air-pressure forming is difficult. If less than 25% by mass, the sheet obtained and articles formed from the sheet tend to be inferior in rigidity.

The resin composition according to the invention consists only of a polylactic acid resin and a polyester resin. That is, it is essential that the sum of the polylactic acid resin content and the polyester resin content be 100% by mass.

Using this resin composition, the biodegradable laminated sheet according to the invention is produced. Such a laminated sheet should comprise a plurality of layers such as two layers, three layers or four layers.

If the biodegradable laminated sheet according to the present invention has two layers, the D-lactic acid contents Da (%) and Db (%) in the polylactic acid resins contained in the respective layers (first and second layers) are determined so as to satisfy the following relations (1)

$$Da \leq 7 \text{ and } Db-Da>3 \qquad (1)$$

Specifically, the D-lactic acid content (Da) in the polylactic acid polymer forming the first layer should be not more than 7%, preferably not more than 5%. If higher than 7%, crystallinity tends to be low even after crystallization treatment, which is described later. This can result in insufficient rigidity of the laminated sheet when the sheet is subjected to loads at high temperature (e.g. 60 to 80 degrees C.). In other words, as the polylactic acid resin contained in the first layer, a material is preferably selected which can be crystallized easily in the below-described crystallization treatment. The lower limit of the Da value is preferably 0.5%. If lower than 0.5%, the sheet obtained may be brittle.

The D-lactic acid content (Db) in the polylactic acid polymer forming the second layer is preferably higher than the content Da by more than 3%. If the difference between Db and Da is 3% or less, the polylactic acid polymer forming the second layer is close both in crystallinity and melting point to the polylactic acid polymer forming the first layer, so that it is practically meaningless to form the sheet from a plurality of layers.

The biodegradable laminated sheet according to the present invention is subjected to crystallization treatment. Crystallization treatment promotes crystallization of a particular polylactic acid resin. The crystallization treatment used in the invention is not particularly limited if it promotes crystallization of a particular polylactic acid resin. For example, crystallization by heating may be used. In crystallization treatment by heating, the sheet may be brought into contact with a hot roll heated to about 60 to 120 degrees C. for several seconds to several minutes, the sheet may be continuously heated by an infrared heater or by hot air for a predetermined period of time, or the sheet may be rolled and heated in an hot air oven heated to 60 to 120 degrees C. for 0.5 to 72 hours.

After crystallization, the polylactic acid resin contained in the first layer has preferably a crystallinity of not less than 20% and not more than 100%, more preferably not less than 25% and not more than 99%. If less than 20%, this may result in insufficient rigidity of the laminated sheet when the sheet is subjected to loads at high temperature (e.g. 60 to 80 degrees C.). The crystallinity of the polylactic acid resin in the first layer may be 100%.

After crystallization, the polylactic acid resin contained in the second layer has preferably a crystallinity of not less than 0% and not more than 20%, more preferably not less than 1% and less than 15%. If over 20%, formability tends to be insufficient, and wrinkles called "bridges" tend to develop. The crystallinity of the polylactic acid resin in the second layer may be 0%.

The polylactic acid resin contained in either of the first and second layers may be a mixture of two or more different kinds of polylactic acid resins. In this case, either of the contents Da and Db is the average of the D-lactic acid contents in the respective two or more kinds of polylactic acid resins.

The biodegradable laminated sheet may be of the two-layer structure, i.e. first layer/second layer structure, the three-layer structure, i.e. first layer/second layer/first layer structure, or four-layer or more-than-four-layer structure such as first layer/second layer/first layer . . . /second layer structure, or first layer/second layer/first layer . . . /first layer structure. Preferably, both outer layers include the first layers and at least one of the inner layers is the second layer. If both outer layers include the first layers, the outer layers are both high in crystallinity, so that the biodegradable laminated sheet has high heat resistance and impact resistance and shows improved formability when it is formed in a vacuum forming machine or an air-pressure forming machine. Between any first and second layers, a recycled resin layer or a layer which is intermediate in properties between the first and second layers may be disposed.

The first layer has preferably a total thickness of 3 to 300 micrometers, more preferably 10 to 200 micrometers, further preferably 30 to 100 micrometers. If less than 3 micrometers, this may result in insufficient rigidity of the laminated sheet when the sheet is subjected to loads at high temperature (e.g. 60 to 80 degrees C.). If over 300 micrometers, formability may be insufficient.

Description is now made of the method of producing the biodegradable laminated sheet according to the present invention. The layers of the sheet can be formed from the above-described resin composition by an ordinary sheet forming method. For example, the layers of the sheet can be formed by extrusion in a T-die cast method. But since polylactic acid resin is high in hygroscopicity and hydrolyzability, moisture control is necessary during the production steps. Thus, if the layers are formed by extrusion using an ordinary single screw extruder, the material should be dehumidified (dried) with e.g. a vacuum drier. If a vent type twin screw extruder is used for extrusion, the sheet layers can be more efficiently formed because such an extruder can more efficiently dehydrate the material.

The method of laminating the thus formed layers to form the laminated sheet is not limited, provided it does not impair the object of the invention. For example, this method may be selected from the following four methods.

(1) Using two or more extruders, the sheet layers are laminated by multi-manifold or feed block type heads, and coextruded in the form of a molten sheet.
(2) One of the sheet layers is unrolled, and the resin as the other layer is applied thereto by coating.
(3) After heating the sheet layers to a suitable temperature, the layers are bonded together by thermal compression by means of rolls or a press.
(4) The layers are laminated together by means of adhesive.

The thus formed biodegradable laminated heat has superior formability, is practically free of bridges, and can be formed in short cycles at a temperature attainable without heating the mold.

Specifically, the biodegradable laminated sheet according to the present invention can be formed into desired articles by any of various methods such as vacuum forming, air-pressure forming, vacuum pressure forming and pressing. The forming temperature of the biodegradable laminated sheet is preferably not less than the melting point of the abovementioned polyester resin and less than the melting point of the polylactic acid resin contained in the first layer. If the forming temperature is less than the melting point of the polyester resin, heat resistance and/or formability may be insufficient. If the forming temperature is equal to or higher than the melting point of the polylactic acid resin contained in the first layer, problems concerning rigidity and formability may arise.

Thus, the biodegradable laminated sheet according to the present invention can be formed into desired article in short forming cycles at a temperature substantially lower than the crystallizing temperature of the polylactic acid resin. Thus, it is not necessary to heat the mold to a temperature close to the crystallizing temperature of the polylactic acid resin (e.g. 80 to 130 degrees C.). The articles thus formed have high heat resistance and impact resistance. This is presumably because the polylactic acid resin contained in the first layer of the biodegradable laminated sheet according to the present invention is at least partially crystallized, and because the polylactic acid resin is mixed with another polyester resin, so that it has a unique viscoelasticity.

Figure 1:
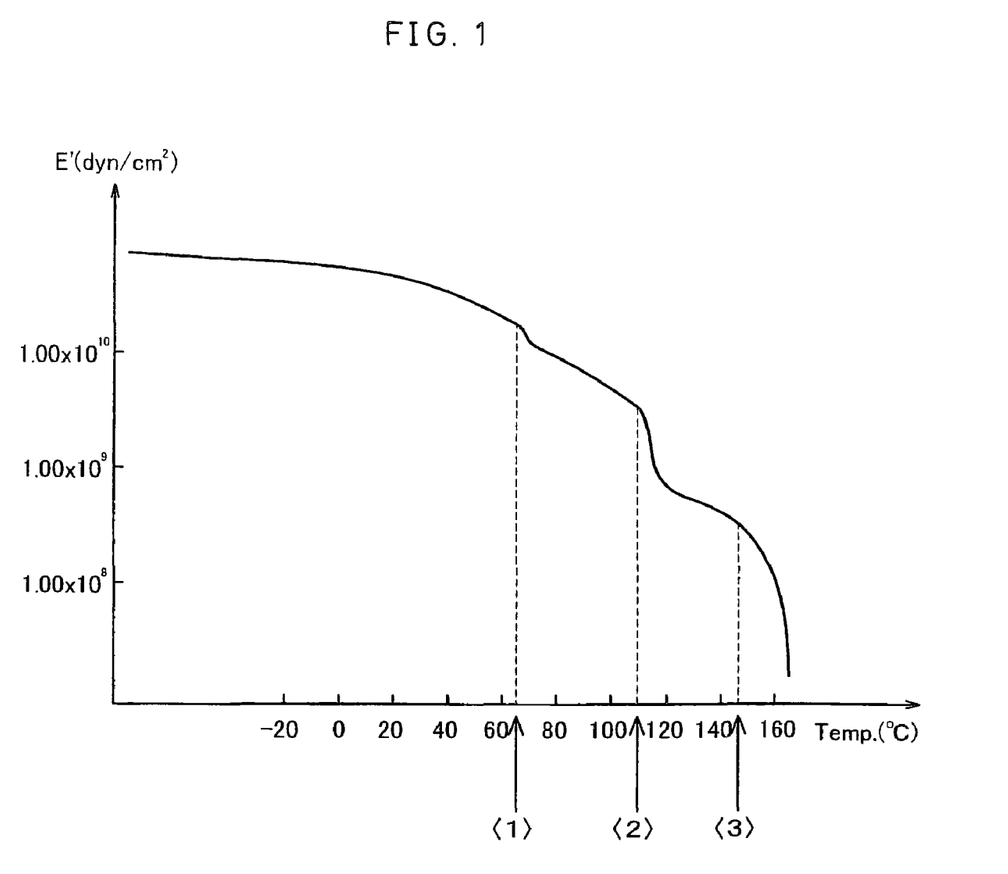
FIG. 1 is a graph showing a typical relationship between the dynamic viscoelasticity of the biodegradable laminated sheet according to the invention and its temperature.

FIG. 1 shows a typical relationship between the dynamic viscoelasticity (E') of the biodegradable laminated sheet according to the invention and its temperature. In FIG. 1, numeral <1> indicates the glass transition temperature (Tg) of the polylactic acid resin, numeral <2> indicates the melting point of the polyester resin, and numeral <3> indicates the melting point of the polylactic acid resin contained in the first layer.

The biodegradable laminated sheet is formable at a temperature between <1> and <3> but is preferably formed at a temperature between <2> and <3>. Since the polylactic acid resin contained in the first layer is at least partially crystallized by the crystallization treatment, the articles obtained have good heat resistance.

The biodegradable laminated sheet according to the present invention can be formed into such articles as lunch boxes, trays and cups for foods such as fish, meat, fruits and vegetables, tofu, cooked foods, desserts and instant noodles, packaging containers for toothbrushes, batteries, drugs and cosmetics, hot-fill containers for puddings, jams and curries, and trays and carrier tapes for transporting electronic parts such as ICs, transistors and diodes.

To the resin composition used to form the biodegradable laminated sheet according to the present invention, additives may added to modify its properties. Such additives include stabilizers, antioxidants, UV absorbers, pigments, antistatic agents, conductive agents, release agents, plasticizers, flavorings, antimicrobials, nucleation agents and ones similar thereto.

EXAMPLES

Examples of the invention and Comparative Examples are now described. These examples are not intended to restrict the present invention in any way. Physical properties of Examples of the invention and Comparative Examples were measured and evaluated as follows.

[Determination and Evaluation]

(1) Evaluation of Heat Resistance 1

Articles formed using a convex mold 75 mm in diameter, 50 mm in depth and 0.67 in drawing ratio were heat-treated by a hot air circulating oven at 80 degrees C. for 20 minutes. The volume reduction rate was calculated as follows:

Volume reduction rate (%)={1−(volume of formed article after heat treatment/volume of formed article before heat treatment)}×100

Articles of which the volume reduction rate is less than 3% are superior, articles of which the volume reduction rate is not more than 6% are practically usable, and articles of which the volume reduction rate is over 6% are not usable.

(2) Evaluation of Heat Resistance 2

Four articles were formed using a convex mold 75 mm in diameter, 50 mm in depth and 0.67 in drawing ratio, and filled with water. Then, with their openings sealed, they were stacked one on another, and subjected to heat treatment in a hot air circulating oven at 65 degrees C. for 60 minutes. After the heat treatment, the articles were observed to determine if they had been deformed.

(3) Evaluation of Impact Resistance 1

Using a hydro-shot impact tester made by Toyo Seiki, shots of 0.5 inches in diameter were hit against each biodegradable laminated sheet specimen at a speed of 3 m/sec, and the energy needed to break the sheet was calculated.

(4) Evaluation of Impact Resistance 2

Articles obtained from each biodegradable laminated sheet specimen were filled with water, and with their openings sealed, they were dropped onto a concrete floor from the height of 1 m. They were then observed to determine if they had been broken.

(5) Measurement of the Glass Transition Temperature (Tg)

Under JIS-K-7121, the glass transition temperature of the polyester was measured by differential scanning calorimetry (DSC) at a heating rate of 10 degrees C./min.

(6) Measurement of the Crystallizing Temperature

Under JIS-K-7121, the heat of fusion (ΔHm) resulting from the polylactic acid resin in the biodegradable sheet and the heat of crystallization (ΔHc) were measured, and based on these values, the crystallinity of the polylactic acid resin was calculated as follows:

Crystallinity: $\chi c\% = (\Delta Hm - \Delta Hc)/(92.8 \times \text{content of the polylactic acid resin in the sheet}) \times 100$ (7) Evaluation of Formability Using a convex mold 75 mm in diameter, 50 mm in depth and 0.67 in drawing ratio (mold temperature: 25 degrees C.), the sheet specimens were subjected to vacuum forming (degree of vacuum: −70 cmHg). The articles thus formed were observed to check how they were shaped, if bridges developed, and any other forming defects. The following are the meanings of the symbols in tables.

○: Good shape
Δ: Practically acceptable
x: Bad shape (8) General Evaluation

Any sample to which symbol ○ is attached for all of the heat resistance 1, heat resistance 2, impact resistance 1 and impact resistance 2 was indicated by symbol ○ in tables, while any sample to which symbol x is attached for any one of the above categories was indicated by symbol X.

(Composition of the Polylactic Acid Resin in the Laminated Sheet)

For the polylactic acid resin forming each laminated sheet specimen, one or a mixture of Nature Works grades made by Cargill Dow (shown in Table 1) was used as shown in Table 2. Where a mixture was used, the D-lactic acid content is the average of the D-lactic acid contents in the respective grades based on their mass fractions.

TABLE 1

|  | Nature Works grade | | |
|---|---|---|---|
|  | 4031 | 4050 | 4060 |
| D-lactic acid (mass %) | 1.2 | 5 | 12 |
| Tg (Tg) | 58 | 58 | 56 |
| Weight-average molecular weight | 200,000 | 190,000 | 190,000 |

TABLE 2

|  |  | Resin No. | | | |
|---|---|---|---|---|---|
|  |  | 1 | 2 | 3 | 4 |
| Nature Works grade | 4031 (mass %) | 100 | 0 | 0 | 0 |
|  | 4050 (mass %) | 0 | 100 | 70 | 0 |
|  | 4060 (mass %) | 0 | 0 | 30 | 100 |
| Average D-lactic acid content (mass %) |  | 1.2 | 5 | 7.1 | 12 |

Example 1 of the Invention

Resin 1 in Table 2 as the polylactic acid, and PBS (polybutylene succinate, made by Showa Highpolymer Co., Ltd.: Bionolle 1001, melting point: 111 degrees C.; glass transition temperature: −40 degrees C.) as the biodegradable aliphatic polyester were mixed together at the rate of polylactic acid resin/biodegradable aliphatic polyester=50/50 (% by mass). To 100% by mass of this mixture, 10% by mass of talc (made by Nippon Talc Co., Ltd.: Micro Ace L1) as an inorganic filler was added, and the mixture was extruded at 220 degrees C. from a multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 3.

Example 2 of the Invention

Resin 1 in Table 2 as the polylactic acid, and the abovementioned type of PBS as the biodegradable aliphatic polyester were mixed together at the rate of polylactic acid resin/biodegradable aliphatic polyester=25/75 (% by mass). To 100% by mass of this mixture, 20% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=25/75 (% by mass). To 100% by mass of this mixture, 20% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 3.

Example 3 of the Invention

Resin 1 in Table 2 as the polylactic acid, and the abovementioned type of PBS as the biodegradable aliphatic polyester were mixed together at the rate of polylactic acid resin/biodegradable aliphatic polyester=75/25 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=75/25 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:100:1. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 3.

Example 4 of the Invention

Except that as the biodegradable aliphatic polyester, PBAT (polybutylene adipate terephthalate, made by BASF, Ecoflex, melting point: 109 degrees C., glass transition temperature: −30 degrees C.) was used, a biodegradable laminated sheet having a thickness of 300 micrometers was obtained in the same manner as in Example 1 of the invention. The thus obtained laminated sheet was evaluated in the above-described manner. The results of evaluation are shown in Table 3.

Example 5 of the Invention

Except that as the biodegradable aliphatic polyester, PBSL (polybutylene succinate lactic acid, made by Mitsubishi Chemical Corporation: AZ81T, copolymer of 94 mole % of succinic acid and 6 mole % of lactic acid, as an acid component, melting point: 110 degrees C., glass transition temperature: −40 degrees C.) was used, a biodegradable laminated sheet having a thickness of 300 micrometers was obtained in the same manner as in Example 1 of the invention. The thus obtained laminated sheet was evaluated in the above-described manner. The results of evaluation are shown in Table 3.

Example 6 of the Invention

Except that as the biodegradable aliphatic polyester, PBSLA (polybutylene succinate adipate lactic acid, made by Mitsubishi Chemical Corporation: AD82W, copolymer of 74 mole % of succinic acid, 20 mole % of adipic acid and 6 mole % of lactic acid, as an acid component, melting point: 87 degrees C., glass transition temperature: −40 degrees C.) was used, a biodegradable laminated sheet having a thickness of 300 micrometers was obtained in the same manner as in Example 1 of the invention. The thus obtained laminated sheet was evaluated in the above-described manner. The results of evaluation are shown in Table 3.

Example 7 of the Invention

Except that as the biodegradable aliphatic polyester, PBSA (polybutylene succinate adipate, made by Showa Highpolymer Co., Ltd.: Bionolle 3001, copolymer of 85 mole % of succinic acid and 15 mole % of adipic acid, as an acid component, melting point: 93 degrees C., glass transition temperature: −40 degrees C.) was used, a biodegradable laminated sheet having a thickness of 300 micrometers was obtained in the same manner as in Example 1 of the invention. The thus obtained laminated sheet was evaluated in the above-described manner. The results of evaluation are shown in Table 3.

Example 8 of the Invention

Resin 1 in Table 2 as the polylactic acid, and the abovementioned type of PBS as the biodegradable aliphatic polyester were mixed together at the rate of polylactic acid resin/biodegradable aliphatic polyester=25/75 (% by mass). To 100% by mass of this mixture, 20% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=25/75 (% by mass). To 100% by mass of this mixture, 20% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:1:1. The thus coextruded layers were brought into contact with casting rolls kept at about 110 degrees C. to obtain a biodegradable laminated sheet having a thickness of 400 micrometers. The thus obtained laminated sheet was evaluated in the above-described manner. The results of evaluation are shown in Table 4.

Example 9 of the Invention

Resin 2 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 115 degrees C. to obtain a biodegradable laminated sheet having a thickness of 300 micrometers. The thus obtained laminated sheet was evaluated in the above-described manner. The results of evaluation are shown in Table 4.

Example 10 of the Invention

Resin 1 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 3 (Db=7.1) in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 100 degrees C. to obtain a biodegradable laminated sheet having a thickness of 300 micrometers. The thus obtained laminated sheet was evaluated in the above-described manner. The results of evaluation are shown in Table 4.

Example 11 of the Invention

Resin 1 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded at 220 degrees C. from a two-layer multi-manifold type head of a co-directional twin-screw extruder having a diameter of 25 mm in the form of a front layer.

Further, Resin 4 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

Since the biodegradable laminated sheet of this example has a two-layer structure, the intermediate layer also serves as the back layer of the sheet. The discharge rate of the molten resin was adjusted such that the front layer and the back layer have thicknesses of which the thickness ratio is 2:5. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 4.

Example 12 of the Invention

Resin 4 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 40 mm in the form of front and back layers.

Further, Resin 1 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 25 mm in the form of an intermediate layer.

The discharge rate of the molten resin was adjusted such that the front layer, intermediate layer and back layer have thicknesses of which the thickness ratio is 3:1:3. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 4.

Example 13 of the Invention

Resin 1 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=50/50 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 40 degrees C. to obtain a biodegradable laminated sheet having a thickness of 300 micrometers. The thus obtained laminated sheet was wound in a roll by the length of about 300 meters. The roll was heated in a hot air oven at 75 degrees C. for 24 hours. After the heat treatment, the laminated sheet was evaluated in the above-described manner. The results of evaluation are shown in Table 4.

Example 14 of the Invention

Resin 1 in Table 2 as the polylactic acid, and the abovementioned type of PBS as the biodegradable aliphatic polyester were mixed together at the rate of polylactic acid resin/biodegradable aliphatic polyester=40/60 (% by mass). To 100% by mass of this mixture, 10% by mass of the abovementioned type of talc as an inorganic filler was added, and the mixture was extruded at 220 degrees C. from the multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=40/60 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 40 degrees C. to obtain a biodegradable laminated sheet having a thickness of 300 micrometers. The thus obtained laminated sheet was wound in a roll by the length of about 300 meters. The roll was heated in a hot air oven at 75 degrees C. for 24 hours. After the heat treatment, the laminated sheet was evaluated in the above-described manner. The results of evaluation are shown in Table 4.

Comparative Example 1

To 100% by mass of Resin 1 in Table 2 as the polylactic acid, 10% by mass of the abovementioned type of talc as an inorganic filler was added, and the mixture was extruded at 220 degrees C. from a single-layer head of a co-directional twin-screw extruder having a diameter of 25 mm. The thus obtained sheet was brought into contact with casting rolls kept at about 110 degrees C. to form a biodegradable sheet having a thickness of 300 micrometers. The sheet obtained was evaluated in the above-described manner. The results of evaluation are shown in Table 5.

Comparative Example 2

To 100% by mass of Resin 1 in Table 2 as the polylactic acid, 10% by mass of the abovementioned type of talc as an inorganic filler was added, and the mixture was extruded at 220 degrees C. from a single-layer head of a co-directional twin-screw extruder having a diameter of 25 mm. The thus obtained sheet was rapidly cooled by bringing the sheet into contact with casting rolls kept at about 40 degrees C. to form a biodegradable sheet having a thickness of 300 micrometers. The sheet obtained was evaluated in the above-described manner. The results of evaluation are shown in Table 5.

Comparative Example 3

Resin 4 in Table 2 as the polylactic acid, and the abovementioned type of PBS as the biodegradable aliphatic polyester were mixed together at the rate of polylactic acid resin/biodegradable aliphatic polyester=80/20 (% by mass). To 100% by mass of this mixture, 10% by mass of the abovementioned type of talc as an inorganic filler was added, and the mixture was extruded at 220 degrees C. from a single-layer head of a co-directional twin-screw extruder having a diameter of 25 mm. The thus obtained sheet was brought into contact with casting rolls kept at about 110 degrees C. to form a biodegradable sheet having a thickness of 300 micrometers. The sheet obtained was evaluated in the above-described manner. The results of evaluation are shown in Table 5.

Comparative Example 4

Resin 1 in Table 2 as the polylactic acid, and the abovementioned type of PBS as the biodegradable aliphatic polyester were mixed together at the rate of polylactic acid resin/biodegradable aliphatic polyester=80/20 (% by mass). To 100% by mass of this mixture, 10% by mass of the abovementioned type of talc as an inorganic filler was added, and the mixture was extruded at 220 degrees C. from a multi-manifold type head of a co-directional twin-screw extruder having a diameter of 20 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=80/20 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:2:1. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 5.

Comparative Example 5

Resin 1 in Table 2 as the polylactic acid, and the abovementioned type of PBS as the biodegradable aliphatic polyester were mixed together at the rate of polylactic acid resin/biodegradable aliphatic polyester=60/40 (% by mass). To 100% by mass of this mixture, 10% by mass of the abovementioned type of talc as an inorganic filler was added, and the mixture was extruded at 220 degrees C. from a single-layer head of a co-directional twin-screw extruder having a diameter of 25 mm. The thus obtained sheet was brought into contact with casting rolls kept at about 110 degrees C. to form a biodegradable sheet having a thickness of 300 micrometers. The sheet obtained was evaluated in the above-described manner. The results of evaluation are shown in Table 5.

Comparative Example 6

Resin 3 ($D_a$=7.1) in Table 2 as the polylactic acid, and the abovementioned type of PBS as the biodegradable aliphatic polyester were mixed together at the rate of polylactic acid resin/biodegradable aliphatic polyester=60/40 (% by mass). To 100% by mass of this mixture, 10% by mass of the abovementioned type of talc as an inorganic filler was added, and the mixture was extruded at 220 degrees C. from a multi-manifold type head of a co-directional twin-screw extruder having a diameter of 25 mm in the form of front and back layers.

Further, Resin 4 in Table 2 as the polylactic acid, and the abovementioned type of PBS as the biodegradable aliphatic polyester were mixed together at the rate of polylactic acid resin/biodegradable aliphatic polyester=60/40 (% by mass). To 100% by mass of this mixture, 10% by mass of the abovementioned type of talc as an inorganic filler was added, and the mixture was extruded from the multi-manifold type head of a co-directional twin-screw extruder having a diameter of 40 mm in the form of an intermediate layer.

The discharge rate of the molten resin was adjusted such that the front layer, intermediate layer and back layer have thicknesses of which the thickness ratio is 1:5:1. The thus coextruded layers were brought into contact with casting rolls kept at about 110 degrees C. to obtain a biodegradable laminated sheet having a thickness of 300 micrometers. The thus obtained laminated sheet was evaluated in the above-described manner. The results of evaluation are shown in Table 5.

TABLE 3

| | | | Examples of the invention | | | | | | |
|---|---|---|---|---|---|---|---|---|---|
| | | | 1 | 2 | 3 | 4 | 5 | 6 | 7 |
| Biodegradable laminated sheet | Entire sheet | Sheet thickness (μm) | | | | 300 | | | |
| | | Layer structure | | | | Three layers | | | |
| | | Layer arrangement* [1] | | | | 1/2/1 | | | |
| | | Ratio of thickness | 1/5/1 | | 1/100/1 | | 1/5/1 | | |
| | | Db − Da (mass %) | | | | 10.8 | | | |
| | First layers | Da (mass %) | | | | 1.2 | | | |
| | | Thickness Total (μm) | 86 | | 6 | | 86 | | |
| | | Crystallinity* [2] (%) | 44 | 45 | 44 | 47 | 46 | 40 | 39 |
| | | Polyester resin Type | | PBS | | PBTA | PBSL | PBSLA | PBSA |
| | | Content (mass %) | 50 | 75 | 25 | | 50 | | |
| | Second layers | Db % | | | | 12 | | | |
| | | Thickness Total (μm) | 214 | | 294 | | 214 | | |
| | | Crystallinity* [2] (%) | 1 | 1.2 | 1 | 1.3 | 2 | 1 | 1.3 |
| | | Polyester resin Type | | PBS | | PBTA | PBSL | PBSLA | PBSA |
| | | Content (mass %) | 50 | 75 | 25 | | 50 | | |
| Evaluation | | Heat resistance 1 (%) | 0.9 | 0.7 | 2.2 | 1.3 | 0.8 | 1.5 | 1.4 |
| | | Heat resistance 2 | ○ | ○ | ○ | ○ | ○ | ○ | ○ |
| | | Impact resistance 1 (Kgf·mm) | 215 | 416 | 125 | 325 | 200 | 285 | 312 |
| | | Impact resistance 2 | ○ | ○ | ○ | ○ | ○ | ○ | ○ |
| | | Formability | ○ | ○ | □ | ○ | ○ | ○ | ○ |
| | | General evaluation | ○ | ○ | ○ | ○ | ○ | ○ | ○ |

* [1] first layer;
* [2] second layer
*Crystallinity of polylactic acid resin contained therein

TABLE 4

| | | | Examples of the invention | | | | | | |
|---|---|---|---|---|---|---|---|---|---|
| | | | 8 | 9 | 10 | 11 | 12 | 13 | 14 |
| Biodegradable laminated sheet | Entire sheet | Sheet thickness (μm) | 400 | | | 300 | | | |
| | | Layer structure | Three layers | | | Two layers | Three layers | | |
| | | Layer arrangement* [1] | 1/2/1 | | | 1/2 | 2/1/2 | 1/2/1 | |
| | | Ratio of thickness | 1/1/1 | 1/5/1 | | 2/5 | 3/1/3 | 1/5/1 | |
| | | Db − Da (mass %) | 10.8 | 7 | 5.9 | | 10.8 | | |
| | First layers | Da (mass %) | 1.2 | 5 | | | 1.2 | | |
| | | Thickness Total (μm) | 267 | | 86 | | 43 | 86 | |
| | | Crystallinity* [2] (%) | 42 | 30 | 43 | 46 | 42 | 42 | 43 |
| | | Polyester resin Type | | | | PBS | | | |
| | | Content (mass %) | 75 | | | 50 | | | 60 |
| | Second layers | Db % | | 12 | 7.1 | | 12 | | |
| | | Thickness Total (μm) | 134 | | 214 | | 257 | +TC 214 | |
| | | Crystallinity* [2] (%) | 1.8 | 2.4 | 9.2 | 1.1 | 3.4 | 1 | 1.1 |
| | | Polyester resin Type | | | | PBS | | | |
| | | Content (mass %) | 75 | | | 50 | | | 60 |
| Evaluation | | Heat resistance 1 (%) | 0.7 | 1 | 0.9 | 1.2 | 1.4 | 0.9 | 0.8 |
| | | Heat resistance 2 | ○ | ○ | ○ | ○ | ○ | ○ | ○ |
| | | Impact resistance 1 (Kgf · mm) | 398 | 270 | 198 | 203 | 222 | 220 | 302 |
| | | Impact resistance 2 | ○ | ○ | ○ | ○ | ○ | ○ | ○ |
| | | Formability | ○ | ○ | ○ | ○ | ○ | ○ | ○ |
| | | General evaluation | ○ | ○ | ○ | ○ | ○ | ○ | ○ |

* [1] first layer;
* [2] second layer
*Crystallinity of polylactic acid resin contained therein

TABLE 5

| | | | Comparative Examples | | | | | |
|---|---|---|---|---|---|---|---|---|
| | | | 1 | 2 | 3 | 4 | 5 | 6 |
| Biodegradable laminated sheet | Entire sheet | Sheet thickness (μm) | | | | 300 | | |
| | | Layer structure | Single layer | | | Three layers | Single layer | Three layers |
| | | Layer arrangement* [1] | 1 | | | 1/2/1 | 1 | 1/2/1 |
| | | Ratio of thickness | — | | | 1/2/1 | — | 1/5/1 |
| | | Db − Da (mass %) | — | | | 10.8 | — | 4.8 |
| | First layers | Da (mass %) | 1.2 | — | | 1.2 | | 7.1 |
| | | Thickness Total (μm) | 300 | — | | 150 | 300 | 86 |
| | | Crystallinity* [2] (%) | 46 | 5.2 | — | 45 | 43 | 10.1 |
| | | Polyester resin Type | None | | | | PBS | |
| | | Content (mass %) | 0 | | | 20 | 40 | |
| | Second layers | Db % | — | | | 12 | — | 12 |
| | | Thickness Total (μm) | — | | 300 | 150 | — | 214 |
| | | Crystallinity* [2] (%) | — | | 3.4 | 1.1 | — | 1.2 |
| | | Polyester resin Type | None | | | PBS | None | PBS |
| | | Content (mass %) | 0 | | | 20 | 0 | 40 |
| Evaluation | | Heat resistance 1 (%) | 82.3 | 84.1 | 8.1 | 6.5 | 1.2 | 1.5 |
| | | Heat resistance 2 | x | x | x | ○ | ○ | x |
| | | Impact resistance 1 (Kgf · mm) | 11 | 10 | 78 | 85 | 156 | 202 |
| | | Impact resistance 2 | x | x | ○ | ○ | ○ | ○ |
| | | Formability | x | ○ | ○ | x | x | ○ |
| | | General evaluation | x | x | x | x | x | x |

* [1] first layer;
* [2] second layer
*Crystallinity of polylactic acid resin contained therein

[Results]

From Tables 3 to 5, it is apparent that Examples 1 to 14 of the invention are superior in any of heat resistance, impact resistance and formability, and that desirable articles are formed from the laminated sheet of any of these examples in ordinary forming cycles.

On the other hand, Comparative Example 1, which does not contain any biodegradable aliphatic polyester, was inferior in impact resistance and heat resistance. Also, shapability of articles in vacuum forming was extremely inferior. Like Comparative Example 1, Comparative Example 2 was also inferior in heat resistance and impact resistance. Particularly with respect to heat resistance 2, containers formed from the sheet of Comparative Example 2 suffered buckling.

Comparative Example 3, which is low in the content of the biodegradable aliphatic polyester, was inferior in heat resistance. Like Comparative Example 2, with respect to heat resistance 2, containers formed from the sheet of Comparative Example 3 suffered buckling. Comparative Example 4 was inferior in heat resistance and formability. Shapability was not good, either.

Comparative Example 5 developed bridges during the evaluation of formability. Containers formed from the sheet of Comparative Example 6 suffered buckling during the evaluation of heat resistance 2.

What is claimed is:

1. A biodegradable laminated sheet comprising at least two layers, each of said two layers comprising:
a resin composition containing 75 to 25 mass percent of a polylactic acid resin, and 25 to 75 mass percent of a polyester resin having a glass transition temperature not exceeding 0 degrees C, and having a melting point higher than the glass transition temperature of said polylactic acid resin, and not exceeding the melting point of said polylactic acid resin, based on 100 mass percent of the total amount of said polylactic acid resin and said polyester resin,
wherein the content Da (%) of D-lactic acid of the polylactic acid resin contained in one of said at least two layers and the content Db (%) of D-lactic acid of the polylactic acid resin contained in the other of said at least two layers satisfy the following relations (1):

$$Da \leq 7 \text{ and } Db - Da > 3 \quad (1)$$

said laminated sheet being subjected to crystallization treatment.

2. The biodegradable laminated sheet of claim 1 wherein said one of said at least two layers have a thickness of 3 to 300 micrometers.

3. The biodegradable laminated sheet of claim 1 wherein said one of said at least two layers comprises two outer layers, said other of said at least two layers being at least one layer disposed between said two outer layers.

4. An article obtained by forming the biodegradable laminated sheet of claim 1 at a temperature of not less than the melting point of the polyester resin and less than the melting point of the polylactic acid resin contained in said one of said at least two layers.

5. A method of forming an article from the biodegradable laminated sheet of claim 1, said method comprising forming said laminated sheet at a temperature of not less than the melting point of the polyester resin and less than the melting point of the polylactic acid resin contained in said one of said at least two layers.

6. A biodegradable laminated sheet comprising at least two layers, each of said two layers comprising a resin composition containing 75 to 25 mass percent of a polylactic acid resin, and 25 to 75 mass percent of a polyester resin having a glass transition temperature not exceeding 0 degrees C., and having a melting point of not less than 80 degrees C. and not exceeding the melting point of said polylactic acid resin, based on 100 mass percent of the total amount of said polylactic acid resin and said polyester resin,
wherein the content Da (%) of D-lactic acid of the polylactic acid resin contained in one of said at least two layers and the content Db (%) of D-lactic acid of the polylactic acid resin contained in the other of said at least two layers satisfy the following relations (1):

$$Da \leq 7 \text{ and } Db - Da > 3 \quad (1)$$

said laminated sheet being subjected to crystallization treatment.

7. The biodegradable laminated sheet of claim 6 wherein said one of said at least two layers have a thickness of 3 to 300 micrometers.

8. The biodegradable laminated sheet of claim 6 wherein said one of said at least two layers comprises two outer layers, said other of said at least two layers being at least one layer disposed between said two outer layers.

9. An article obtained by forming the biodegradable laminated sheet of claim 6 at a temperature of not less than the melting point of the polyester resin and less than the melting point of the polylactic acid resin contained in said one of said at least two layers.

10. A method of forming an article from the biodegradable laminated sheet of claim 6, said method comprising forming said laminated sheet at a temperature of not less than the melting point of the polyester resin and less than the melting point of the polylactic acid resin contained in said one of said at least two layers.

11. A biodegradable laminated sheet comprising at least two layers, each of said two layers comprising a resin composition containing 75 to 25 mass percent of a polylactic acid resin, and 25 to 75 mass percent of a polyester resin having a glass transition temperature not exceeding 0 degrees C., and having a melting point higher than the glass transition temperature of said polylactic acid resin, and not exceeding the melting point of said polylactic acid resin, based on 100 mass percent of the total amount of said polylactic acid resin and said polyester resin,
wherein the content Da (%) of D-lactic acid of the polylactic acid resin contained in one of said at least two layers and the content Db (%) of D-lactic acid of the polylactic acid resin contained in the other of said at least two layers satisfy the following relations (1):

$$Da \leq 7 \text{ and } Db - Da > 3 \quad (1)$$

said polylactic acid resin contained in said one of said at least two layers having a crystallinity of not less than 20% and not more than 100%, said polylactic acid resin contained in said other of said at least two layers having a crystallinity of not less than 0% and less than 20%.

12. A biodegradable laminated sheet comprising at least two layers, each of said two layers comprising a resin composition containing 75 to 25 mass percent of a polylactic acid resin, and 25 to 75 mass percent of a polyester resin having a glass transition temperature not exceeding 0 degrees C., and having a melting point of not less than 80 degrees C. and not exceeding the melting point of said polylactic acid resin, based on 100 mass percent of the total amount of said polylactic acid resin and said polyester resin,
wherein the content Da (%) of D-lactic acid of the polylactic acid resin contained in one of said at least two layers and the content Db (%) of D-lactic acid of the polylactic acid resin contained in the other of said at least two layers satisfy the following relations (1):

$$Da \leq 7 \text{ and } Db - Da > 3 \quad (1)$$

said polylactic acid resin contained in said one of said at least two layers having a crystallinity of not less than 20% and not more than 100%, said polylactic acid resin contained in said other of said at least two layers having a crystallinity of not less than 0% and less than 20%.

* * * * *